US006967997B2

(12) United States Patent
Humphrey (10) Patent No.: US 6,967,997 B2
(45) Date of Patent: Nov. 22, 2005

(54) MULTI-CARRIER CONNECTION INITIALIZATION AND SYMBOL TRANSMISSION

(75) Inventor: Les Humphrey, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 870 days.

(21) Appl. No.: 09/750,873

(22) Filed: Dec. 28, 2000

(65) Prior Publication Data

US 2002/0085640 A1 Jul. 4, 2002

Related U.S. Application Data

(60) Provisional application No. 60/222,496, filed on Aug. 2, 2000.

(51) Int. Cl.[7] .......................... H04B 1/38; H04L 27/28
(52) U.S. Cl. .................... 375/222; 375/260; 375/295; 370/208; 370/480
(58) Field of Search .................... 375/219, 222, 375/260, 295, 296, 297, 308; 370/204, 208, 370/481, 482, 480, 485

(56) References Cited

U.S. PATENT DOCUMENTS

| 4,809,296 | A | * | 2/1989 | Braun et al. ................ 375/347 |
| 6,442,129 | B1 | * | 8/2002 | Yonge et al. ............... 370/204 |
| 6,625,174 | B1 | * | 9/2003 | Hethuin et al. ............ 370/481 |

FOREIGN PATENT DOCUMENTS

EP 0 854 619 A 7/1998 ........... H04L 27/26

OTHER PUBLICATIONS

Jayalath A D S et al: "Reduced Complexity PTS and New Phase Sequences for SLT to Reduce PAP of an OFDM Signal" VTC 2000-Spring. 2000 IEEE 51st. Vehicular Technology Conference, New York, NY: IEEE, US, vol. 3 of 3 Conf. 51 May 15, 2000.
ITU-T G.992.2 (Jun./1999) Spitterless Asymmetric Digital Subscriber Line (ADSL) transceivers.
ITU-T G.992.1 (Jun./1999) Asymmetric Digital Subscriber Line (ADSL) transceivers.
ITU-T G.994.1 (Jun./1999) Handshake procedures for digital subscriber line (dsl) transceivers.
ITU Telecommunications Standardization Sector, Study Group 15, Temporary Document HC-034—G.gen.bis: An improved 8 bits/symbol messaging scheme for G.lite.bis and G.dmt.bis.

* cited by examiner

Primary Examiner—Young T. Tse
(74) Attorney, Agent, or Firm—Barnes & Thornburg (57) ABSTRACT

A method of transmitting symbols in a wireline multi-carrier communication system in which each symbol is modulated for transmission over a carrier group of pre-determined size. The method involves, identifying all available carrier groups, and transmitting a replicate of the symbol on each of the available carrier groups. In preferred embodiments, the individual signals transmitted over respective carriers are phase-offset relative to each other in order to mitigate potential peaks in signal power. Corresponding apparatus and the generated signal are also provided.

16 Claims, 7 Drawing Sheets

Fig. 7

MULTI-CARRIER CONNECTION INITIALIZATION AND SYMBOL TRANSMISSION

RELATED APPLICATION

This application is the non-provisional filing of Provisional Application No. 60/222,496, filed on Aug. 2, 2000.

FIELD OF THE INVENTION

The present invention relates to a method and apparatus for initialisation of a modem connection for, and symbol transmission over, a multi-carrier telecommunication network, for example digital subscriber line, and a system incorporating the same.

BACKGROUND TO THE INVENTION

Telecommunication systems that interconnect wire line subscriber terminals are being developed to support broadband data communication. More particularly, recent developments in broadband communication protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and High-speed Digital Subscriber Line (HDSL) protocols, for example, can support data rates of 2 Mbps over distances of approximately three kilometers, while more complex schemes (such as VDSL) can support data rates of 8 Mbps and above over distances of, typically, less than two kilometers. Line codes such as discrete multi-tone (DMT), which can be used for Very high-speed Digital Subscriber Line (VDSL), utilise multiple sub-channel carriers, e.g. in a DMT environment, to provide an adaptive system that mitigates the effects of cross-talk by selectively ignoring noise-affected sub-channel carriers or reducing the number of bits supported by the sub-channels. As will be appreciated, DMT provides a comb of frequency carriers that are each separated modulated and then combined to generate a composite signal envelope. As such, information (both control information and traffic) is distributed across a number of different frequency carriers.

Presently, some xDSL systems (and the like) utilise a time division duplex transmission scheme in which a communication resource (such as a dedicated channel within frequency limits) has a time-split use for up-link and down-link transmissions between line termination equipment (LTE) and customer premises equipment (CPE). More specifically, the up-link and down-link may have different traffic capacities, i.e. there is a fixed but potentially asymmetric symbol capacity (or number of time slots) between the up-link and the down-link assigned for the entire duration of a call. For example, in an Internet-type environment, it is usually beneficial to have a higher down-link capacity since information download is the dominant data flow, whereas voice traffic generally requires equal traffic capabilities in both directions.

In frequency division duplex (FDD) systems, spectrum is allocated between the up-link and down-link.

In relation to bundles of wireline communication resources, it is also important to consider the potentially undesirable effects associated with cross-talk interference. Specifically, with bidirectional communication, the relative location of the lines, for example, between twisted copper-pair causes cross-talk interference to be induced into proximately located wireline communication resources (principally by the mechanisms of capacitive and inductive coupling and by radiation arising from the imperfect nature and performance of the cabling). Moreover, where symmetrical and asymmetrical service are simultaneously required on pairs in the same bundle, cross-talk becomes a significant problem, as will readily be appreciated.

It is known in such systems to use an initialisation training sequence to identify connection parameters for use in transmitting and receiving subsequent user data.

Such systems include, for example, those described in ITU-T pre-published Recommendations G.992.1 "Asymmetrical Digital Subscriber Line (ADSL)" and G.992.2 "Splitterless Asymmetric Digital Subscriber Line (ADSL) Transceivers". ITU-T Recommendation G.994.1 "Handshake Procedures for Digital Subscriber Line (DSL) Transceivers".

A problem with the negotiation protocols used in such systems is that they can be unreliable owing to, amongst other causes, the presence of increasing levels of loss of data owing to unacceptably high signal attenuation and consequent low Signal-to-Noise Ratio (SNR) particularly on longer connections between headend and subscriber.

A known approach to try to address these problems is to send two simultaneous copies of each symbol, each copy being sent over a separate, pre-defined group of carriers. For an 8 bit/symbol encoding, QPSK modulated, such a group consists of 4 adjacent carriers, each carrying 2 bits of the symbol. The intention is that if one group fails to be received, the symbol may nevertheless be recovered, by the receiver, from the second backup group.

However, it is not uncommon for the backup group also to fail, thereby causing failure of the communication, as a whole, requiring the initialisation sequence to be re-started.

An alternative approach, still retained for the most critical initialisation information, involves using a reduced bit/symbol encoding, for example 1 bit/symbol.

A problem here however is that such encodings, whilst more reliable individually, require longer transmission times per message, thereby unacceptably lengthening initialisation times.

It is also known, from ITU-T Study Group 15 Temporary Document HC-034 to replace the use of a pre-defined pair of groups by a dynamically negotiated group, whereby account can be taken of the frequency distribution of the channel SNR.

This has the added disadvantage however, of extra complexity and of requiring transmission of additional symbols communicating the selection of the specific negotiated channel carriers forming the groups, thereby once again undesirably extending the training time.

OBJECT OF THE INVENTION

The invention seeks to provide an improved method and apparatus for initialisation of connections for multi-carrier (e.g. Digital Multi-Tone (DMT)) systems in general and for Digital Subscriber Line (DSL) systems in particular.

Another object of the present invention is to provide a method of transmitting symbols in a wireline multi-carrier communication system which overcomes or at least mitigates the problems noted above.

SUMMARY OF THE INVENTION

According to a first aspect of the present invention there is provided a method of transmitting symbols in a wireline multi-carrier communication system in which each symbol is modulated for transmission over a carrier group of pre-determined size the method comprising the steps of: identifying all available carrier groups; transmitting a replicate of the symbol on at least half of the available carrier groups.

Preferably, the symbol is transmitted on all available carrier groups.

Preferably, the method also comprises the step of: applying a pre-determined phase-shift to the symbol transmitted on at least one of the available carrier groups, whereby, to mitigate peaks in transmitted instantaneous signal power across all carriers.

Preferably, all replicates are phase-shifted relative to each other.

In one preferred embodiment, the method additionally comprises the step of: for at least one available carrier group, phase-shifting a symbol portion transmitted on a carrier in the carrier group relative to a second carrier in the carrier group, whereby to mitigate peaks in transmitted signal power across all carrier groups.

Preferably, all signal portions within a carrier group are phase-shifted relative to each other.

Preferably, the step of phase-shifting is applied to all available carrier groups.

According to a further aspect of the present invention there is provided a method of transmitting initialisation messages in a wireline multi-carrier communication system comprising the steps of: partitioning an initialisation message into one or more symbols; modulating one of the symbols for transmission over a carrier group of know size; identifying all available carrier groups; transmitting a replicate of said one of the symbols on each available carrier group.

In a preferred embodiment, the initialisation messages are DSL messages

In further preferred embodiments, the initialisation messages are selected from the group consisting of VDSL, ADSL, G.Lite and G.DMT messages.

The invention also provides for a system for the purposes of digital signal processing which comprises one or more instances of apparatus arranged to carry out the method together with other additional apparatus.

According to a further aspect of the present invention there is provided a transmitter for a wireline multi-carrier communication system comprising; a modulator for modulating symbols for transmission over a pre-determined number of carriers; a carrier allocator arranged to identify all available carrier groups having the pre-determined number of carriers; a replicator arranged to output a replicate of each of the symbols on each of the available carrier groups.

According to a further aspect of the present invention there is provided a modem for a wireline multi-carrier communication system comprising a transmitter according to the present invention.

According to a further aspect of the present invention there is provided a wireline multi-carrier communication system comprising a transmitter according to the present invention.

Preferably, the symbols form connection initialisation messages.

Preferably, the initialisation messages are DSL messages.

Preferably, the initialisation messages are selected from the group consisting of VDSL, ADSL, G.Lite and G.DMT messages.

Preferably, the transmitter additionally comprises: a phase shifter arranged to determine the transmission phase on the available carrier responsive to pre-determined carrier phase-shift data.

The invention is especially suitable for Digital Subscriber Line (DSL) systems in general and Asymmetric Digital Subscriber Line (ADSL) systems in particular. ADSL systems here specifically includes (but is not limited to) G.Lite and G.DMT systems. It is also applicable to, for example, VDSL systems.

The invention is also directed to a communications signal generated according to the described methods.

Specifically, there is provided a multi-carrier transmission signal in a wireline multi-carrier communications system, the signal comprising: simultaneous transmission of a modulated symbol over all available carrier groups.

Preferably, a first symbol portion on a carrier in one of the carrier groups is phase-offset relative to a second symbol portion on a second carrier in one of the available carrier groups, whereby to instigate peaks in signal power The invention is also directed to a program for a computer, comprising components arranged to perform each of the method steps.

According to a further aspect of the present invention, there is provided a method of establishing a connection between a transmitter and a receiver in a wireline communication system, the method comprising the steps of: at the transmitter, partitioning a connection initialisation message into one or more symbols, modulating each symbol for transmission over a carrier group of predetermined size, identifying all available carrier groups, and transmitting a replicate of each symbol on at least half the carrier groups; and at the receiver, receiving said replicates of each symbol reconstructing the initialisation message from said received replicate symbols, and opening the connection in response to the initialisation message.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
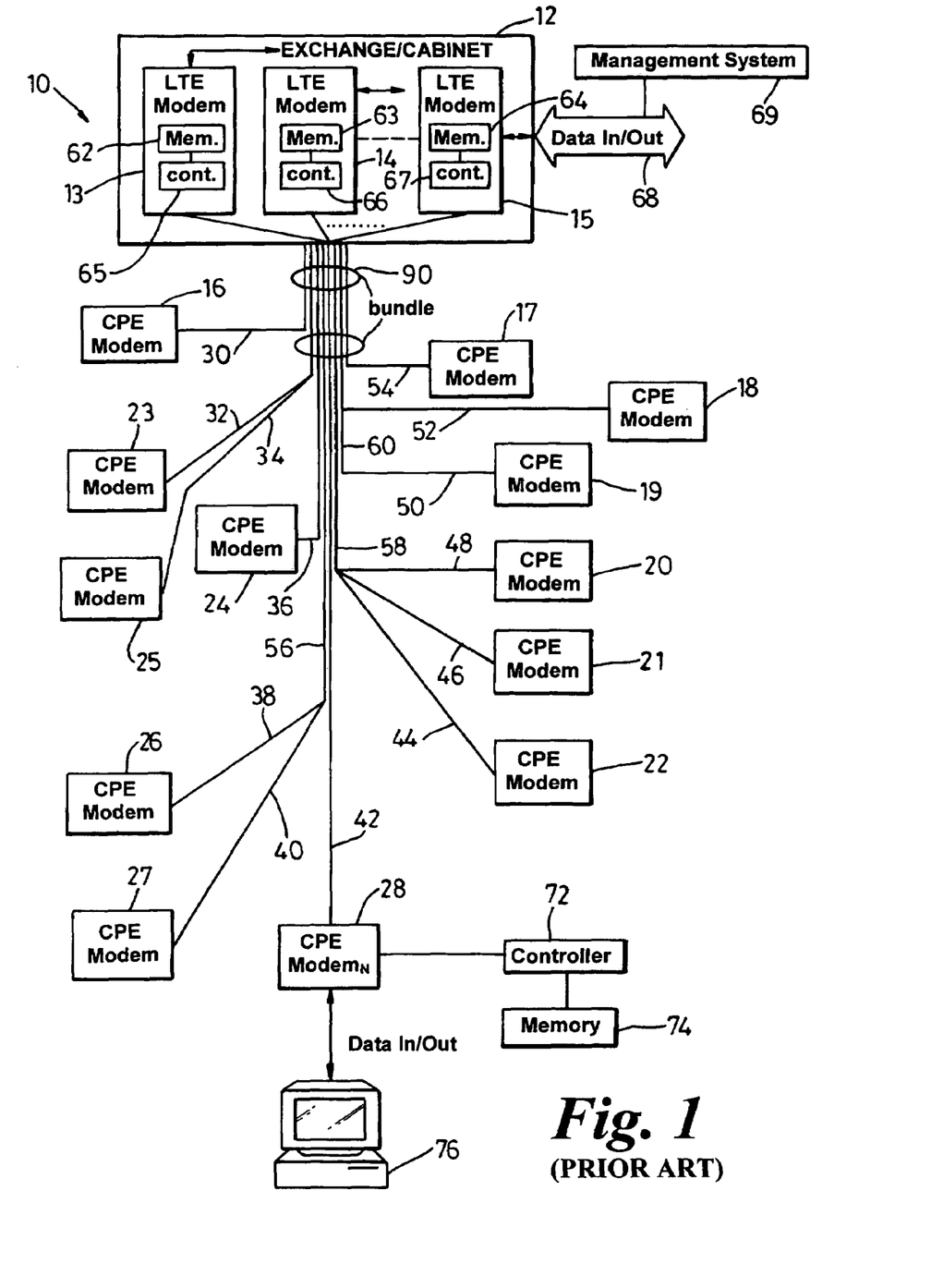
FIG. 1 shows a schematic diagram of a typical wire line communication system that may be functionally modified to support the concepts of the present invention.

FIG. 1 is a schematic diagram of a typical wireline communication system 10 that may be functionally modified to support the concepts of the present invention. The wireline system 10, which supports data over voice in a FEXT limited and (typically) xDSL-type environment, comprises an exchange (or cabinet) 12 usually containing a multiplicity of Line Terminating Equipment (LTE) modems 13–15 each separately coupled to a subscriber Customer Premises Equipment (CPE) modems 16–28 through individual (or sometimes shared) twisted pairs 30–60. The twisted pairs 30–60 are typically made of adjoining lengths of copper, although aluminium sections are sometimes present.

The twisted pairs may also be realised as non-terminated cable pairs in which so-called "bridge taps" exist. As will be understood, such non-terminated cables typically exhibit resonance characteristics at xDSL frequencies, which bridge taps therefore result in the production of notches in an insertion loss measurement of the cable. The twisted pairs are often unshielded.

Each LTE modem 13–15 in the exchange 12, which may be one of many within the wireline communication system 10 as a whole, typically comprises a respective memory 62–64 and an associated controller 65–67 that oversees the operation of each LTE modem 13–15. Each LTE modem therefore provides an interface to the twisted pairs 30–60. The controller 65–67 is usually realised as a microprocessor or digital signal processor (DSP) and generally functions, without limitation, to control encoding and modulation of data onto channel carriers, and also provides error correction, interleaving of data, operation timing, baud rate and the administration (i.e. the generation and interpretation) of control information in relation to a call. The memory 62–64 stores call-related information and system algorithms required for functional operation. Furthermore, although specific detail of the exchange has been omitted for the sake of clarity, transmit and receive chains within the exchange 12 act to provide an information interface 68 (in the sense of both analog voice and digital data). The exchange/cabinet 12 (which can generally be described as a network terminating node) also usually has a management system 69 that orchestrates operation of the exchange 12 and acts to accumulate data pertaining to the instantaneous or historic operation of the network.

The structure of each CPE modem 16–28 is functionally complementary to that of the LTE modems 13–15, as will be readily appreciated. More particularly, each CPE modem 16–28 generally provides a line interface to a twisted pair. An interconnected controller 72 manages the operation and timing of the CPE modem (as shown in relation to CPE modem 28), while some memory 74 is also associated with the controller 72. Each CPE modem allows interconnection of a computer 76 or the like to the exchange. Furthermore, while the CPE modems 16–28 are shown as physically separate entities, it will be appreciated that the modems may, in fact, be integral within the computer or the like.

The LTE and CPE modems may support a number of alternative communication protocols, such as discrete multi-tone, with the modems capable of operating across a wide bandwidth, typically from a few kiloHertz to several (and usually tens of) MegaHertz.

The wireline communication system 10 of FIG. 1 therefore has a tree-like structure in which at least one bundle 90 of collocated twisted pairs feeds into the exchange (or cabinet) 12, while each bundle 90 of twisted pairs branches with distance from the LTE to provide individual (or shared) drops to specific CPE modems 16–28. Usually, each branch from the bundle 90 occurs at a street cabinet or kerb-side unit, as will be appreciated, whereby each branch may, in fact, support more than one twisted pair. CPE modems 16–28 within the wireline communication system 10 are therefore distributed at different loop distances from the LTE 12. However, it will be appreciated that the physical location of each CPE modem 16–28 may not be indicative of the loop distance because the loop may, in fact, be circuitous and indirect.

Figure 2:
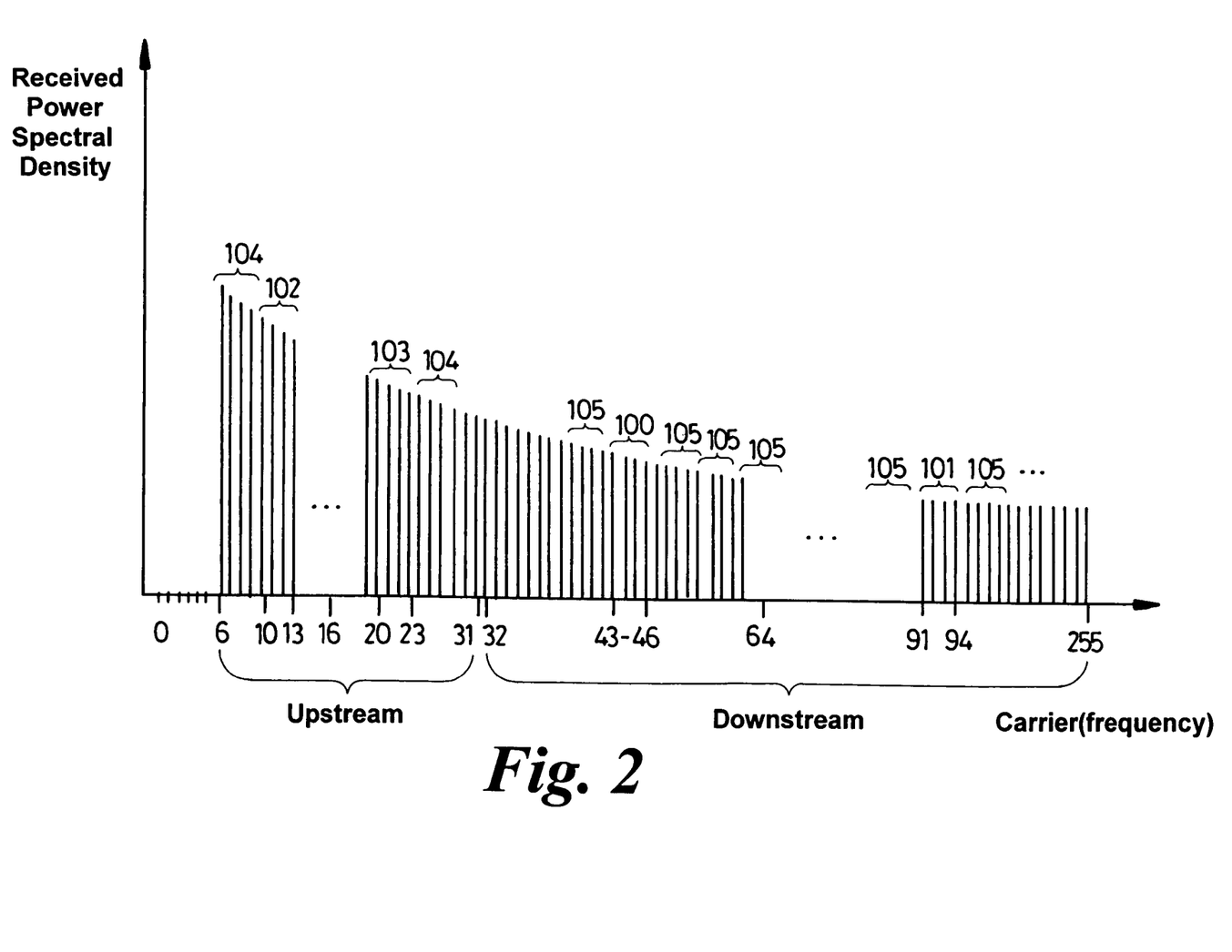
FIG. 2 shows carrier allocation in a DSL System according to the present invention.

Referring now to FIG. 2, in a typical DMT system, the available carriers are partitioned between upstream and downstream traffic.

In the examples shown in FIG. 2, carriers 6–31 are reserved for upstream communication (bandwidth associated with carriers 0–5 being reserved for conventional POTS services), whilst carriers 32–255 are reserved for downstream communication. In a conventional FDM implementation, carriers 16 (upstream) and 64 (downstream) may be further reserved as pilot carriers, and so are not available.

Other carriers may likewise be unavailable for data traffic.

The figure also allows use of the groups of carriers used in the prior art of G.992.1 and G.992.2 for initialisation messages using 8 bit/symbol over 4 carriers (QPSK) downstream direction, the primary set 100 consists of carriers #43–46 with backup carriers 101 being #91–94; in the upstream direction, the primary set 102 is #10–13 and the backup set 103 is #20–23.

Carriers in any specific group need not be adjacent, though they are adjacent in the preferred embodiment illustrated here.

In the present invention, additional carrier groups 104, 105 are employed over and above the conventional backup carriers, occupying a much larger proportion of the available carriers—more than half of the available carrier groups, for example and certainly using many more then the two carrier groups of known systems—and, ideally, utilising all available groups.

By employing large numbers of carrier groups in this way, and especially where all available carrier groups are used, this method maximises the likelihood of successful symbol transmission whilst at the same time obviating the need for time-consuming communication of information detailing which carriers are expected to produce most reliable communication. Using all available carrier groups effectively ensures not only that the best carrier group will be utilised but also that, in the event the predicted best carrier group fails, maximum backup capability is available to recover otherwise lost symbols, thereby avoiding time-consuming retransmission.

It is not sufficient however to transmit replicates of the symbols on all available carrier groups without taking into account the potential problems that could arise from the additional power transmitted by transmitting on all available carriers. If all symbols are sent in phase with each other, then this can give rise to highly undesirable peaks in the instantaneous signal power.

To avoid this potential problem, the modulated signals sent on distinct carrier groups may be phase-offset, one from another according to a pre-determined plan.

For best results, the phase-offsetting may also be applied on a per-carrier rather than on a per-group basis.

In addition, the phase set defining the relative phase for each individual line should preferably be set with a fixed random offset with respect to other systems in the line bundle. This will then assist in minimising the likelihood of false detection, arising, for example, from ADSL/correlated RFI being correlated so as to obscure the same piece of information (2 bits) in each group.

Figure 3:
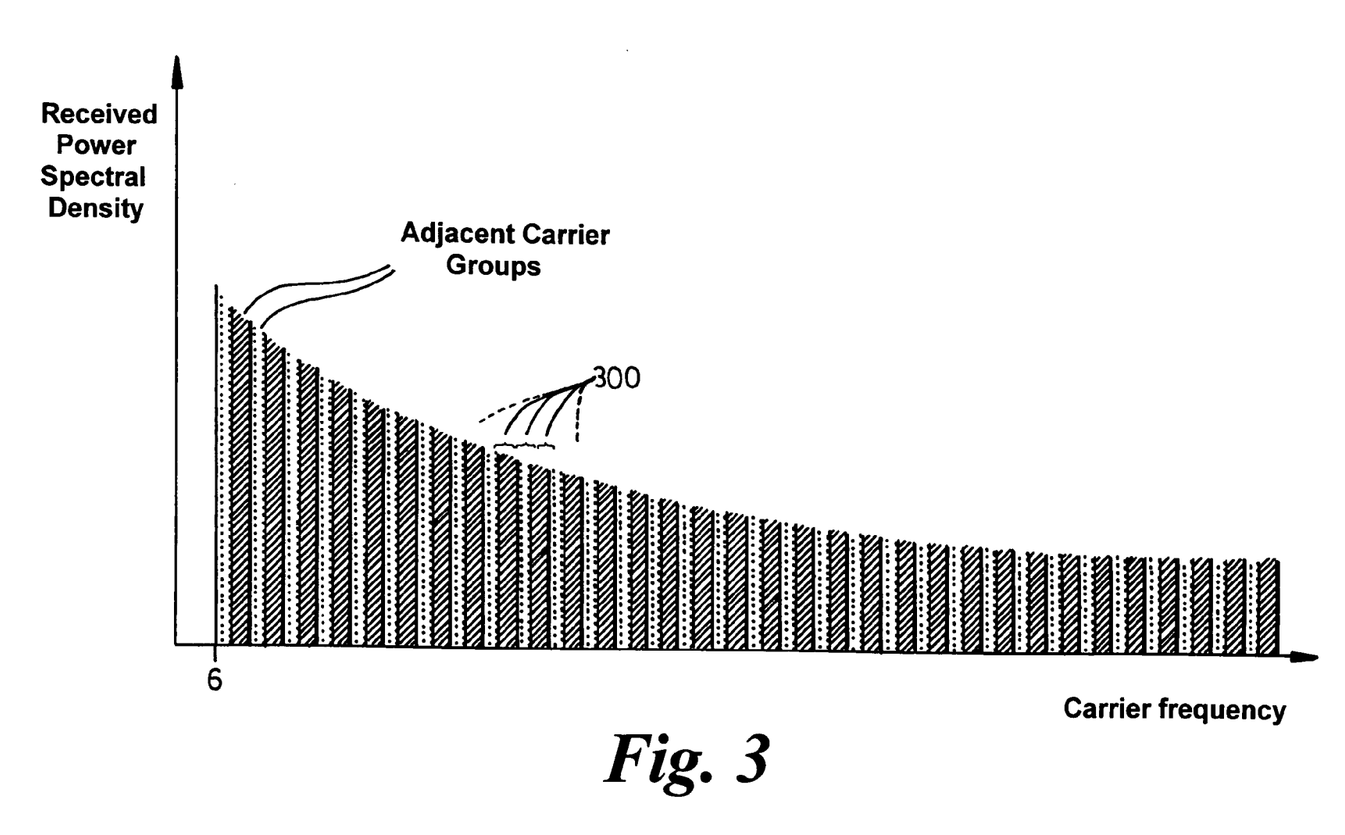
FIG. 3 shows an example of carrier group structuring according to the present invention.

Referring now to FIG. 3, there is shown a graph of received power spectral density against carrier frequency, illustrating one possible arrangement of carrier groups 300 across the spectrum.

Figure 4:
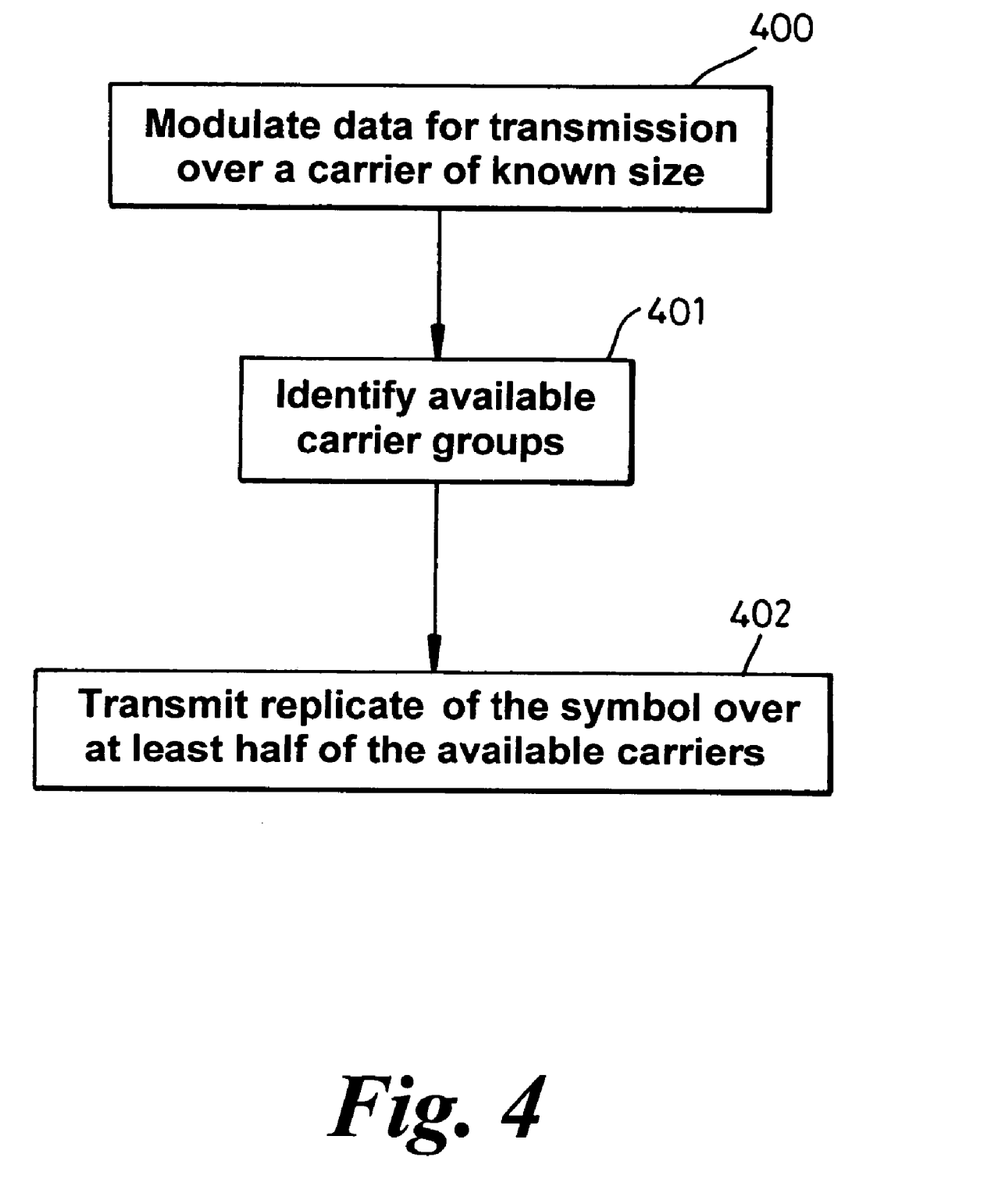
FIG. 4 shows a flowchart of a signal transmission method in accordance with the present invention.

FIG. 4 shows a high level method steps for transmitting symbols according to the present invention, involving the steps of:

Modulating data for transmission over a carrier of pre-determined size 400;

Identifying available carrier groups 401; and

Transmitting replicates of the symbol over at least half of the available carriers 402.

Figure 5:
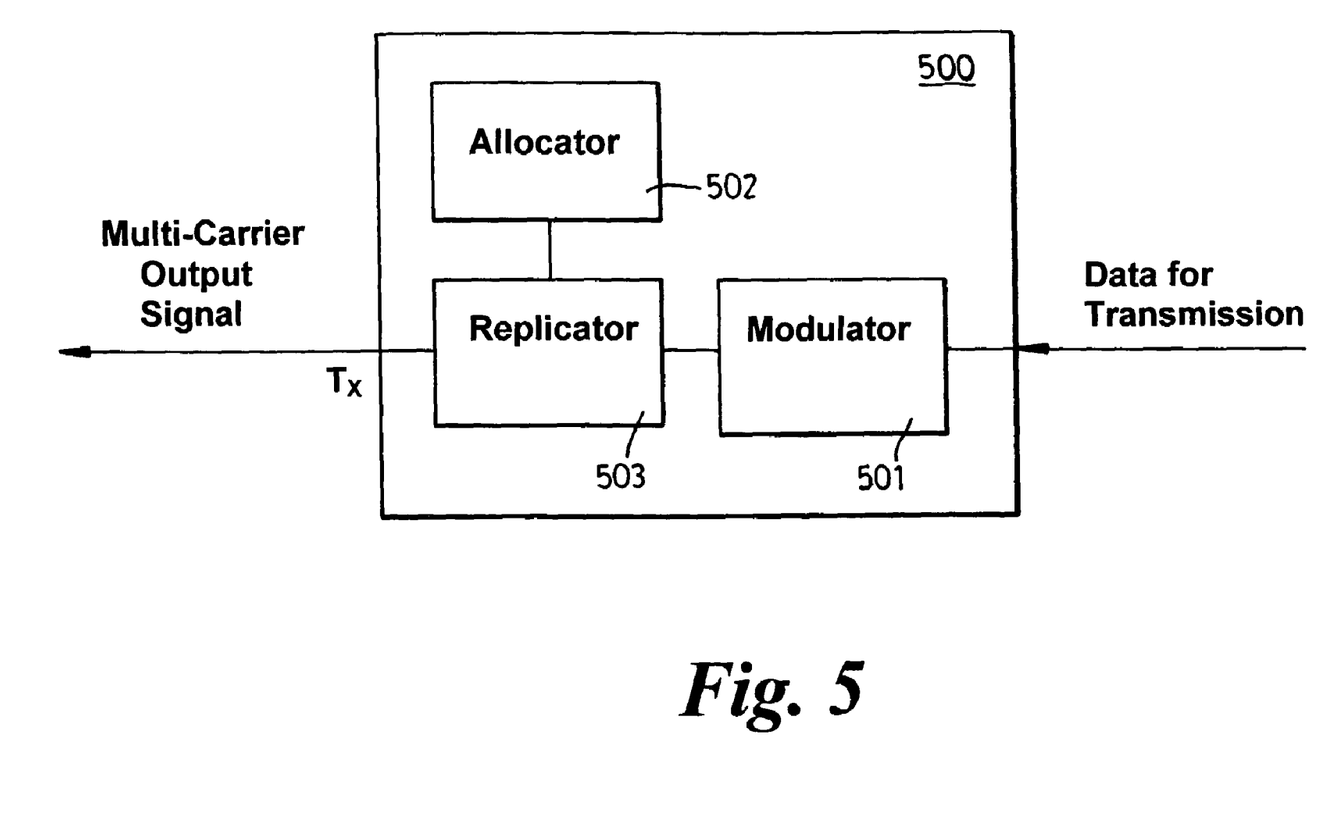
FIG. 5 shows a functional block diagram of a modem transmitter in accordance with the present invention.

Referring now to FIG. 5, the schematic structure of a suitable transmitter 500 is shown comprising a modulator 501 arranged to receive data for transmission, an allocator 502 arranged to control transmission over selected carrier groups, and a replicator 503 arranged to replicate modulated symbols generated by the modulator 501.

Figure 6:
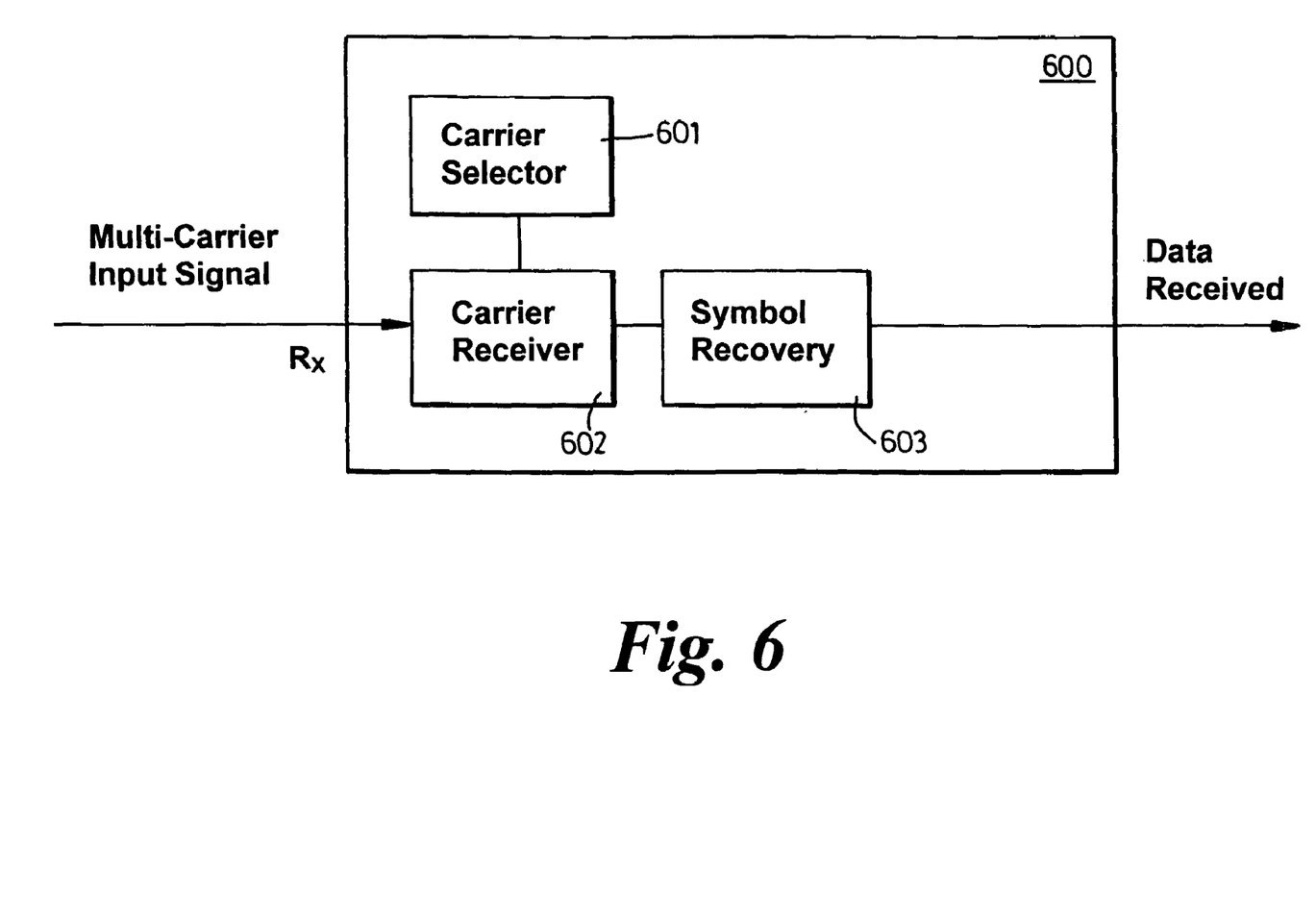
FIG. 6 shows a functional block diagram of a modem receiver in accordance with the present invention.

Referring now to FIG. 6, at the receiving end of the link, the receiver 600 is arranged to receive the replicates of the sent symbol. Where a symbol has been sent over a large proportion, or all of the available carrier groups the receiver can recover 603 the symbol provided at least one of the utilised carrier groups is successfully received 602, thereby obviating re-start of the initialisation sequence. Successive symbols received and recovered in this way, are used to reconstruct the sent initialisation message allowing a connection to be established with minimum retransmission and consequent delay.

The selection of a specific carrier group 601 may be made by analysing the signal quality (for example Signal to Noise Ratio (SNR)) of the received carrier groups and selecting one having an adequate, or preferably best, quality. Especially where quality is poor for all received groups, it may be improved by adding the received signals from multiple groups together to extract the carried symbols.

When adding the signals from multiple carrier groups to improve the SNR, the phase of the carrier may need to be corrected to account both for the deliberate phase offsets introduced by the transmitter and for systematic phase errors in transmission.

Figure 7:
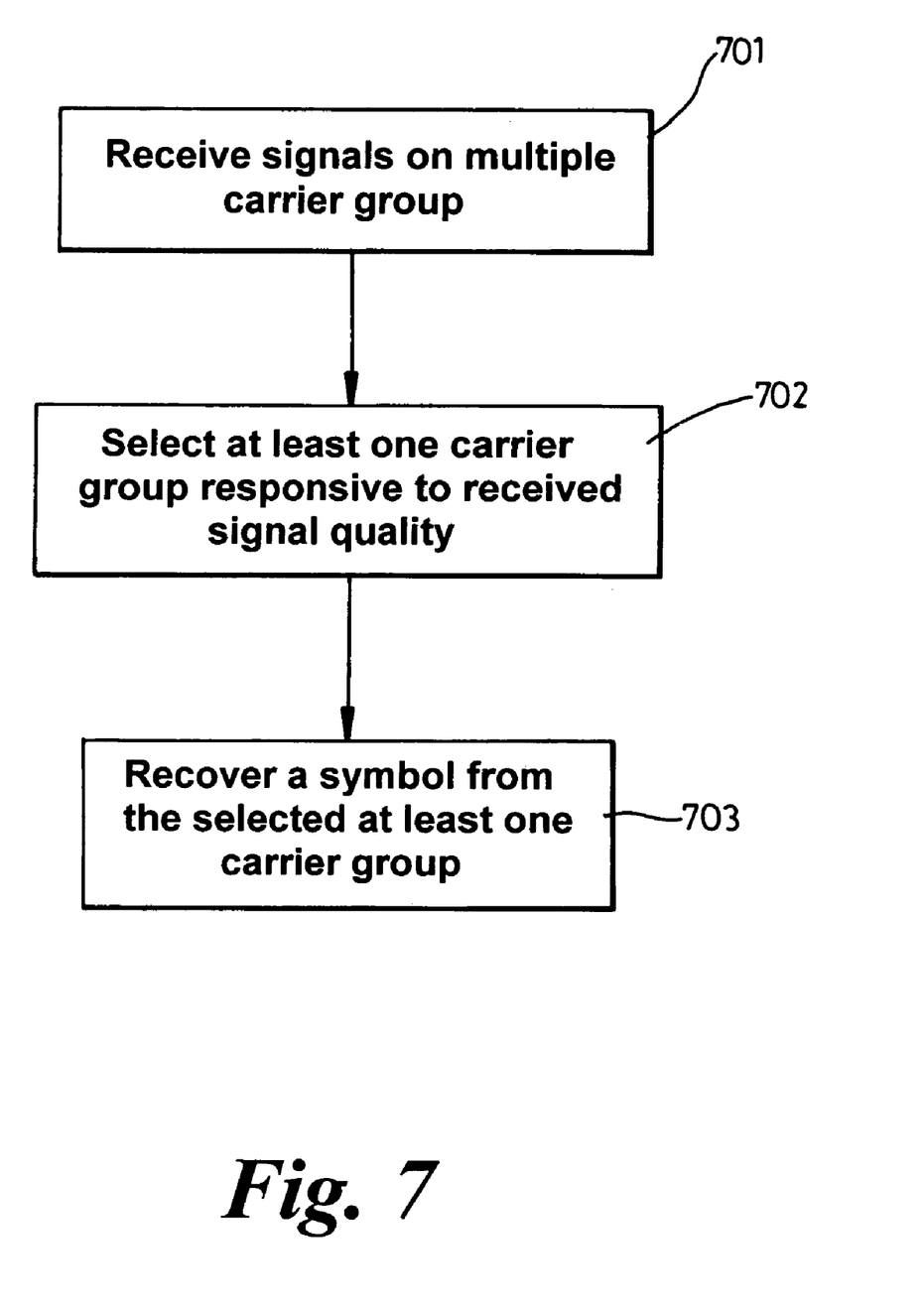
FIG. 7 shows a flowchart of a signal receipt method in accordance with the present invention.

Referring finally to FIG. 7 there is shown a high level method for receiving symbols according to the present invention, involving the steps of:

receiving signals on multiple carrier groups 701;

selecting at least one carrier group responsive to received signal quality 702; and recovering a symbol from the selected at least one carrier group 703.

Any range or device value given herein may be extended or altered without losing the effect sought, as will be apparent to the skilled person for an understanding of the teachings herein.

I claim:

1. A method of transmitting symbols in a wireline multi-carrier communication system in which each symbol is modulated for transmission over a carrier group of known size, the method comprising the steps of:
    identifying all available carrier groups; and
    transmitting a replicate of the symbol on each of at least half of the available carrier groups.

2. A method according to claim 1 wherein the replicate of the symbol is transmitted on each of all available carrier groups.

3. A method according to claim 2 wherein each replicate of the symbol transmitted on each of all available carrier groups is phase-shifted relative to another replicate.

4. A method according to claim 1 additionally comprising the step of:
    applying a phase-shift to each of said at least half one of the available carrier groups, whereby to mitigate peaks in transmitted instantaneous signal power across said at least half of the available carrier groups.

5. A method according to claim 1 additionally comprising the step of:
    for at least one of said at least half of available carrier groups, phase-shifting a symbol portion transmitted on a first carrier in the carrier group relative to a second carrier in the carrier group, whereby to mitigate peaks in transmitted signal power across said at least half of the available carrier groups.

6. A method according to claim 5, wherein each symbols portion within a carrier group is phase-shifted relative to other symbol portions of said carrier group.

7. A method according to claim 5, wherein the step of phase-shifting is applied to all of said at least half of the available carrier groups.

8. A method of transmitting initialisation messages in a wireline multi-carrier communication system, the method comprising the steps of:
    partitioning an initialisation message into one or more symbols;
    modulating one of the symbols for transmission over a carrier group of known size;
    identifying all available carrier groups; and
    transmitting a replicate of said one of the symbols on each available carrier group.

9. A method according to claim 8, wherein the initialisation messages are Digital Subscriber Line (DSL) messages.

10. A method according to claim 8 wherein the initialisation messages are selected from the group consisting of Very High Speed Digital Subscriber Line (VDSL) and Asymmetric Digital Subscriber Line (ADSL).

11. A transmitter for a wireline multi-carrier communication system comprising:
    a modulator for modulating symbols for transmission over a pre-determined number of carriers;
    a carrier allocater arranged to identify all available carrier groups having the pre-determined number of carriers; and
    a replicator arranged to output a replicate of each of the symbols on each of the available carrier groups.

12. A modem comprising the transmitter according to claim 11.

13. A transmitter according to claim 11 wherein the replicator is arranged to determine the transmission phase on available carrier responsive to pre-determined carrier phase-shift data.

14. A program for a computer on a machine readable medium for transmitting symbols in a wireline multi-carrier communication system in which each symbol is modulated for transmission over a carrier group of known size, the program being arranged to perform the steps of:

identifying all available carrier groups; and transmitting a replicate of the symbol on each of at least half of the available carrier groups.

15. A program for a computer on a machine readable medium for transmitting initialisation messages in a wireline multi-carrier communication system, the program being arranged to perform the steps of:

partitioning an initialisation message into one or more symbols;

modulating one of the symbols for transmission over a carrier group of known size;

identifying all available carrier groups; and transmitting a replicate of said one of the symbols on each available carrier group.

16. A method of establishing a connection between a transmitter and a receiver in a wireline communication system, the method comprising the steps of:

at the transmitter, partitioning a connection initialisation message into one or more symbols, modulating each symbol for transmission over a carrier group of predetermined size, identifying all available carrier groups, and transmitting a replicate of each symbol on at least half the available carrier groups; and the receiver, receiving said replicates of each symbol, reconstructing the initialisation message from said received replicate symbols, and opening the connection in response to the initialisation message.

* * * * *